Patented Sept. 17, 1929

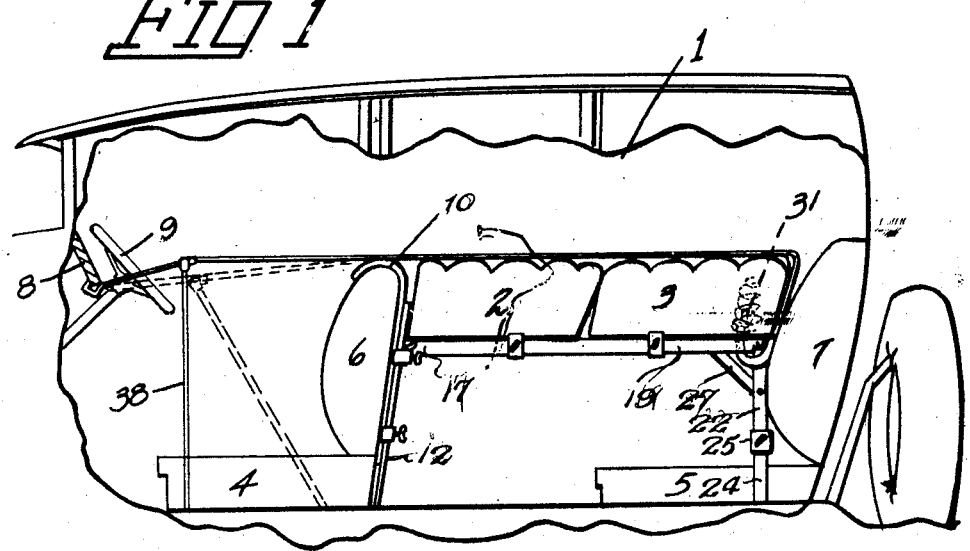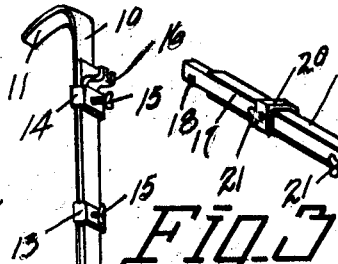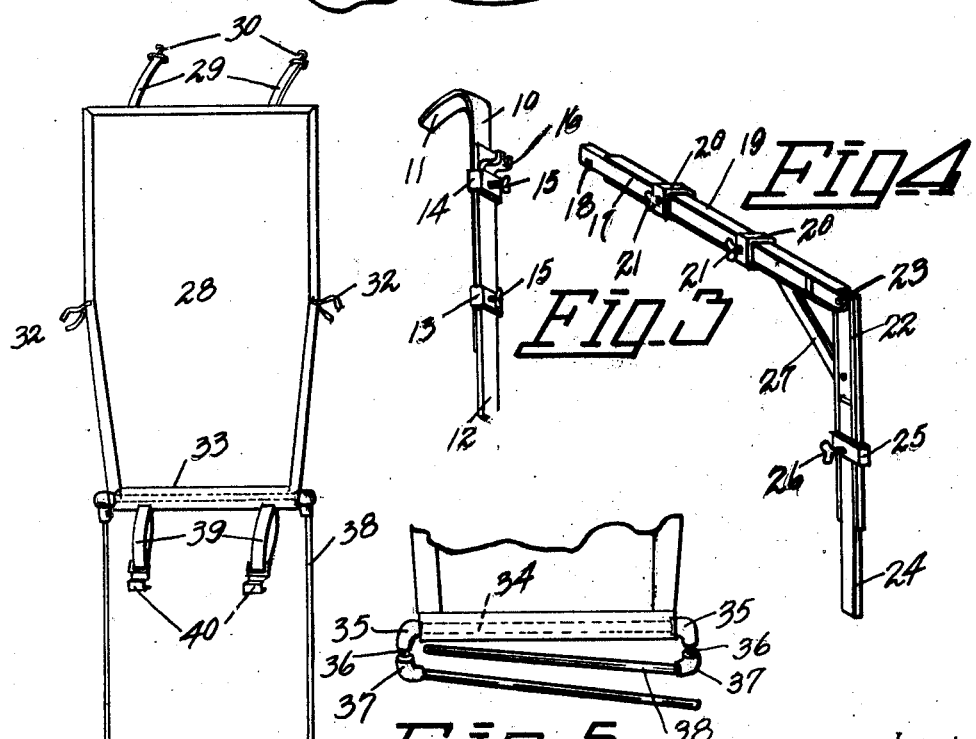

1,728,422

UNITED STATES PATENT OFFICE

WILLIAM C. LUNDSTROM, OF SPOKANE, WASHINGTON

AUTOMOBILE BED

Application filed September 3, 1927. Serial No. 217,455.

My present invention relates to improvements in automobile beds designed for use particularly in automobiles and adapted to be elevated on a line with the tops of the backs of the front and rear seats of the automobile.

Foldable brackets are provided which when not in use, may be compactly arranged and stored away, and a canvas strip is utilized in connection with the removable seats of the automobile for converting the seats into a bed.

The invention consists in certain novel combinations and arrangements of parts as will hereinafter be more specifically set forth and claimed.

In the accompanying drawings, I have illustrated one complete example of the physical embodiment of my invention wherein the parts are combined and arranged according to the best mode I have so far devised for the practical application of the principles of my invention.

Figure 1 is a view showing the automobile body partly broken away and illustrating the bed set up for use;

Fig. 2 is a plan view of the canvas cover for the bed showing the attaching devices;

Fig. 3 is a perspective view of one of the extensible supporting posts;

Fig. 4 is a perspective view of one of the extensible supporting frames; and

Fig. 5 is a detail view at the front of the bed cover showing the front legs of the bed, the latter being folded into compact form.

In Fig. 1, I have designated a portion of the car body as 1 and the front seat 2 with the rear seat 3, these seats being removable from their bases or frames 4 and 5, and the back portion of the front seat is designated 6 while the back portion of the rear seat is designated 7.

At the front of the car body, the usual dashboard or instrument board is designated 8 and the steering wheel is indicated as 9. The bed is made up of and includes the cushions 2 and 3 of the front and rear seats as indicated in Fig. 1 where these cushions or seats have been removed from their usual places and are supported on the bed frame. This bed frame comprises two intermediate posts that are designed for coaction with the back 6 of the front seat, and a pair of rear posts that are designed for location in front of and in combination with the back 7 of the rear seat. Each of the intermediate posts comprises an upper arm 10 having a hook 11 to fit over the top of the back 6, and a slidable leg 12 is connected with this arm 10 by means of encircling bands or loops 13 and 14. These loops are provided with set screws 15 and it will be apparent that the members 10 and 12 may be slid relatively one to another to adjusted position and clamped by means of the screws 15. The band 14 has a notched bracket 16, and it will be understood that two of these intermediate posts are used, one near each end of the back portion 6, with the hooks 11 over the top edge of these portions as shown in Fig. 1.

In combination with these intermediate posts, I use a pair of extensible and foldable frame bars as shown in Fig. 4. Each of these frame bars comprises a horizontal slide bar 17 having a hook 18 that coacts with the bracket 16 of the band 14, and this slide bar is relatively movable in the channel bar 19. Bands or loops 20 encircle these members and set screws 21 in the bands or loops are used to fix the parts in adjusted position. To the arm of this frame part, a leg 22 is pivoted at 23, and an extension piece 24 is slidable in the channel member 22. A band 25 encircles the members 24 and 22 and a set screw 26 is used to clamp these parts together. The frame member including the horizontal arm and the vertical leg is pivoted at 23 and a diagonally extending brace 27 is used to support the horizontal member of this frame. In Fig. 1, it will be seen that the members 22 and 24 form the rear posts for the bed, and the members 17 and 19 form the horizontal bars upon which the cushions 2 and 3 of the bed are supported.

Over the top of the cushions and the back 6 of the front seat is spread a canvas cover 28 which is of sufficient width to extend over the width of the car and of sufficient length to extend from the rear to the front of the car. At the rear end the cover is provided with straps 29 and hooks 30 at their ends, and these straps are turned under the rear part of the cushion 3 and the hooks 30 are engaged in a part of the cushion, as for instance one of the springs 31. In this manner, the cover is anchored at the rear and may be stretched taut toward the front when the bed is being made up. At the sides of the cover are provided tie straps 32 which may be tied to suitable supports and at the front edge of the cover is fashioned a casing 33 in which is located a transverse bar 34 having elbows 35 at its ends. In these elbows are threaded short pipe lengths 36 and a second pair of elbows 37 are screwed on these short length pipes. The front legs of the bed as 38 are screwed into the second pair of elbows, and it will be apparent that these front legs may be folded compactly as indicated in Fig. 5 to permit storage of the canvas. As shown in Fig. 5, the legs are brought to parallel position and then the canvas cover is rolled about these legs in order to store the parts.

At the front edge of the canvas cover are provided straps 39 having hooks 40, and these hooks may engage under the instrument or dashboard 8 as indicated in Fig. 1.

After the parts have all been properly assembled, the front legs 38 are placed in the position indicated by dotted lines in Fig. 1. Then the pair of legs 38 are swung forward to the full line position in Fig. 1, thus stretching taut the canvas cover to the full line position. The seats and equipment of my invention are thus readily made up and converted into a convenient and comfortable bed, and the parts may with equal facility be dismantled when necessary. The bed cover may be detached and rolled up, the cushions returned to their set supports, and the extensible and adjustable members forming the bed frame may be compactly adjusted and all parts stored away when not needed.

Having thus fully described my invention, what I claim as new and desire to secure by Letters Patent is—

The combination in a convertable bed frame, of a pair of spaced, unconnected frame members, each frame member comprising a leg and a hooked arm slidable longitudinally with respect to each other, a pair of spaced bands encircling said leg and hooked arm and provided with setscrews whereby the hooked arm and leg may be held in longitudinal adjustment; an extensible frame bar including a slide bar and a channel bar, bands encircling the slide and channel bars provided with setscrews whereby they may be longitudinally adjusted; an extensible leg pivoted to said channel bar, a notched bracket on one of the first mentioned encircling bands, and a hooked end on said slide bar engaging said notched bracket.

In testimony whereof I affix my signature.

WILLIAM C. LUNDSTROM.